United States Patent [19]
Yamazaki et al.

[11] Patent Number: 5,339,091
[45] Date of Patent: Aug. 16, 1994

[54] PAPERLESS PORTABLE BOOK

[75] Inventors: Shunpei Yamazaki, Tokyo; Toshiji Hamatani, Atsugi, both of Japan

[73] Assignee: Semiconductor Energy Laboratory Co., Ltd., Kanagawa, Japan

[21] Appl. No.: 961,021

[22] Filed: Oct. 14, 1992

Related U.S. Application Data

[63] Continuation of Ser. No. 702,122, May 16, 1991, abandoned, which is a continuation of Ser. No. 205,750, Jun. 13, 1988, abandoned, which is a continuation-in-part of Ser. No. 70,589, Jul. 7, 1987, abandoned.

[30] Foreign Application Priority Data

Jul. 7, 1986 [JP] Japan .................. 61-160651
Sep. 1, 1986 [JP] Japan .................. 61-134751

[51] Int. Cl.⁵ ............................... G09G 3/36
[52] U.S. Cl. .................. 345/104; 345/121; 345/901
[58] Field of Search ........... 340/706, 707, 708, 712, 340/784, 789, 798, 799, 750; 320/2, 61; 136/243, 244, 245, 249, 250, 251, 255, 258, 259, 261, 291; 359/56; 345/104, 121, 901

[56] References Cited

U.S. PATENT DOCUMENTS

| | | | |
|---|---|---|---|
| 4,017,725 | 4/1977 | Roen | 136/291 |
| 4,159,417 | 6/1979 | Rubincam | 340/706 |
| 4,264,962 | 4/1981 | Kodaira | 136/291 |
| 4,293,808 | 10/1981 | Varadi et al. | 136/251 |
| 4,345,248 | 8/1982 | Togashi et al. | 340/784 |
| 4,409,605 | 10/1983 | Ovshinsky et al. | 136/258 AM |
| 4,413,314 | 11/1983 | Slater et al. | 340/712 |
| 4,563,059 | 1/1986 | Clark et al. | 350/330 |
| 4,587,520 | 5/1986 | Astle | 340/712 |
| 4,639,720 | 1/1987 | Rympalski et al. | 340/707 |
| 4,654,467 | 3/1987 | Yamazaki | 136/251 |
| 4,785,564 | 11/1988 | Gurtler | 340/707 |
| 4,924,411 | 5/1990 | Kashiwagi | 340/750 |

FOREIGN PATENT DOCUMENTS

| | | | |
|---|---|---|---|
| 0058281 | 5/1981 | Japan | 136/245 |
| 0194586 | 11/1982 | Japan | 136/291 |
| 60-124724 | 7/1985 | Japan | 340/712 |
| 2049253 | 12/1980 | United Kingdom | 340/712 |
| 2149544 | 6/1985 | United Kingdom | 340/784 |

OTHER PUBLICATIONS

Hoffman, Jr.; "Exact Position Detection with Finger Point and Feedback"; IBM Technical Disclosure Bulletin; vol. 23, No. 6; Nov. 1980.

Beacham et al.; "Using Word Perfect"; copyright 1987; pp. 103–106, 119–123, 136 and 137.

John M. Murray et al.; "The Architecture of an Electronic Book"; IEEE Transactions on Industrial Electronics; vol. IE-29, No. 1; Feb. 1982; pp. 82–91.

*Primary Examiner*—Richard Hjerpe
*Attorney, Agent, or Firm*—Sixbey, Friedman, Leedom & Ferguson

[57] ABSTRACT

A paperless portable electronic book is disclosed which is adapted for use with interchangeably magnetic floppy discs, or the like and comprises reproducing device for reading information from the floppy disc, a display and a battery. Preferentially, the display is a liquid crystal and the battery is an amorphous silicon solar cell.

8 Claims, 3 Drawing Sheets

PAPERLESS PORTABLE BOOK

This application is a continuation of Ser. No. 07/702,122, filed May 16, 1991, now abandoned, which itself was a continuation of Ser. No. 07/205,750, filed Jun. 13, 1988, now abandoned, which was a continuation-in-part of Ser. No. 07/070,589, filed Jul. 7, 1987, now abandoned.

BACKGROUND OF THE INVENTION

The present invention relates to a paperless book, and more particularly relates to a paperless book which is in readily transportable and is compact and convenient for assembly in book collection such as in the home, schools and colleges, and in libraries.

A vast quantity of printed matter is widely distributed in the form of books. Such printed books comprise at least several tens of paper sheets and often several hundreds of paper sheets, and therefore the weight of the book can be quite substantial. Especially in the case of novels and books for professional use, the weight of a copy may exceed 1 Kg. Because of this, books are generally transported by trucks to book shops and other retailers, which increases their cost due to the high transportation cost. Furthermore, the books are often somewhat large in size so that a large amount of space has to be provided for storing books.

SUMMARY OF THE INVENTION

It is therefore an object of the invention to provide a paperless book which is in a form that is convenient for transportation.

It is another object of the invention to provide a paperless book which requires only a small amount of space for its storage.

In order to accomplish the above objects, the invention proposes that an electronic display and an electronic memory are used in place of printed paper to provide a handy device for reading written material.

More particularly, the information consisting of characters such as letters, symbols and the like, is converted into digital form. Namely, the information in the form of printed words of a book is converted into a suitably encoded digital form on a memory such as a magnetic floppy disc, an optical disc or other convenient storage device. The paperless book according to the invention is comprised of a reproducing device for use with such a memory and, a suitable display. The reader views the display in place of reading the printed paper of a conventional book.

According to a preferred embodiment of the invention which is described hereinafter there is thus provided a portable paperless book comprising, in an integrated unit generally in the shape of a book, a reader for a magnetic floppy disc, optical disc, or other interchangeable compact digital storage medium, a processor, an input facility operable to cause said processor to process information retrieved from the digital storage medium, display means for displaying such information, and a solar cell for powering the unit, the unit comprising a body portion and a cover portion hingedly connected thereto with the display means being provided in the cover portion.

By virtue of the invention, a collection, of conventional books can be replaced by one reproducing device as abovementioned and a collection of floppy disc or other compact memories each weighing, for example, only 10 g to 30 g. Furthermore, only the light weight memories need be transported to book retailers.

The invention becomes more advantageous if the reproducing devices are unified in the reproducing system or at least in a particular group. For example, if one reproducing device is provided for each student in a school, the students do not have to bring their heavy books to school and instead they need only carry the light weight memories.

DETAILED DESCRIPTION OF THE PREFERRED EMBODIMENT

Figure 1:
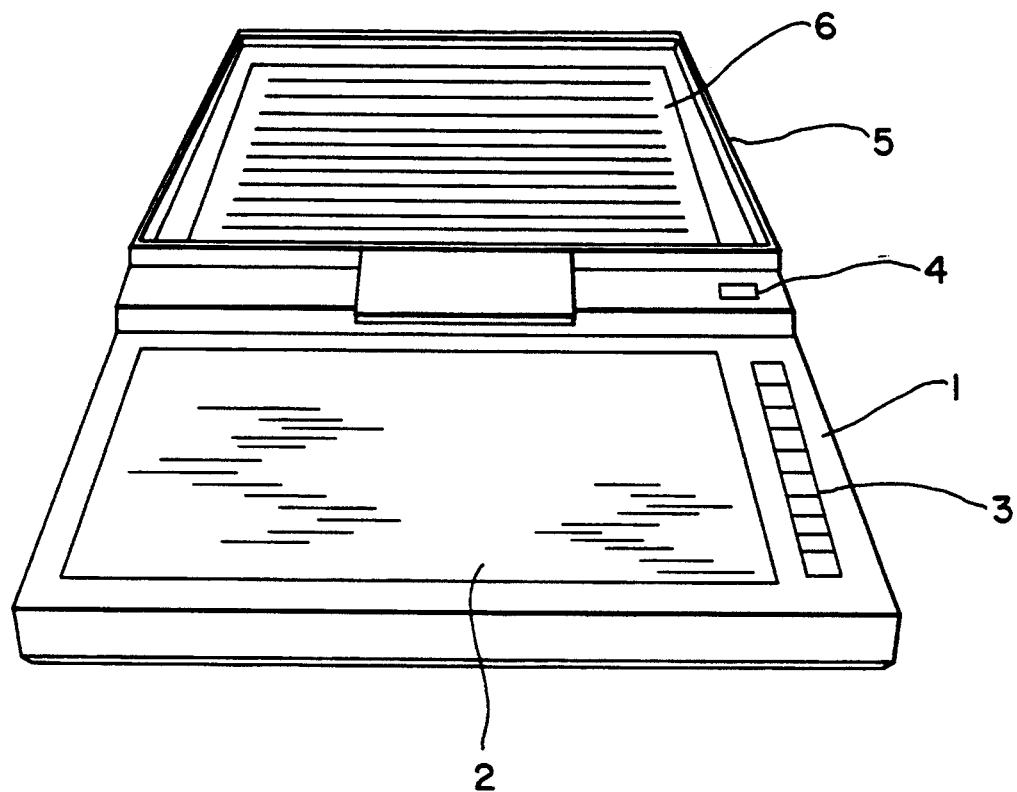
FIG. 1 is a perspective view showing an examplary paperless book in accordance with the invention.
Figure 2:
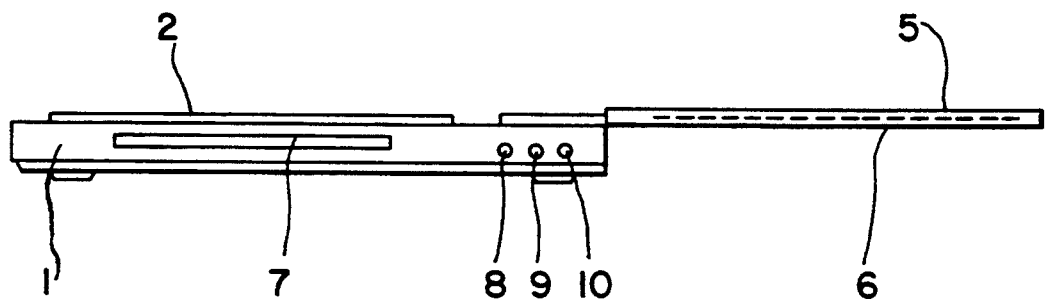
FIG. 2 is a side elevation view showing the paperless book of FIG. 1.
Figure 3:
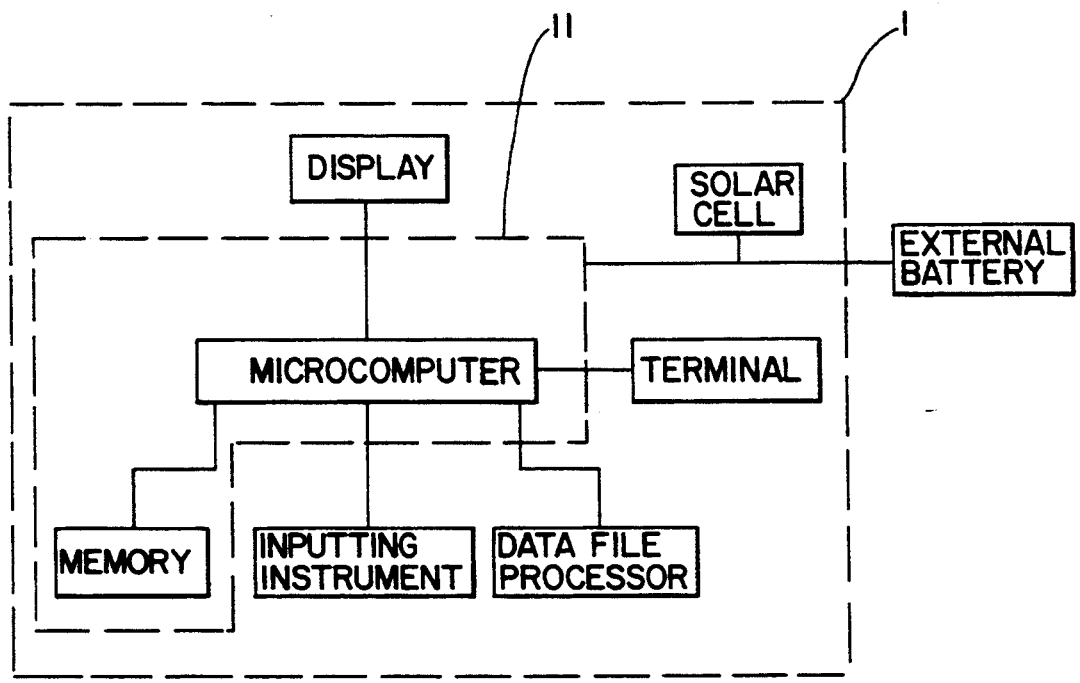
FIG. 3 is a block diagram of the paperless book of FIG. 1 and FIG. 2.

Referring now to FIGS. 1, 2 and 3, a portable paperless book in accordance with the present invention is illustrated. The book comprises a reproducing device 1 having a display 2, keybuttons or other external input facilities 3, and on/off switch 4 operated by opening and closing a hinged lid 6 of the device. A solar cell module 5 for auxiliary energy supply is provided on the lid 6, a data file processor 7, an input terminal 8 for connection of an external electricity supply to the disc, and terminals 9 an 10 for inputting data from an external device are also provided.

In the illustrated embodiment, the display 2 is a liquid crystal display and the data file processor is a disc drive adapted for use with optical discs on which stored information is stored in terms of variation in the reflectance of the disc to incident light. A magnetic floppy disc and associated magnetic read heads can be employed in place of the optical disc and its associated reader. Liquid crystal displays are preferred in that they do not over stimulate the eyes, but other display formats can be used. The solar cell 6 is an amorphous silicon semiconductor solar cell of 200 mm length and 300 mm width.

The amorphous silicon solar cell consists of a plurality (e.g., 25) of photoelectric conversion devices connected to each other in series, each conversion device comprising a transparent substrate (such as a glass or plastic plate, or the like), a transparent conductive film such as indium tin oxide, $SnO_2$, $ZnO$ or multiple layers thereof formed on the substrate and constituting a first electrode of the cell, a multi-layered amorphous silicon semiconductor incorporating a PIN junction therein formed by a known CVD process, and a second transparent conductive film formed over the semiconductor. The conversion devices are manufactured by using laser processing techniques scribing the layers deposited on the 200 mm×300 mm substrate. By virtue of the transparency of the substrate and the underlying and overlying electrodes, the solar cell can receive sunlight from both sides of the lid so that power generation can continue regardless of whatever the lid is opened or closed.

The paperless book according to the invention is further provided with a processing unit 11 shown schematically in FIG. 3 and comprising a microcomputer and a memory. By means of this unit, information reproduced by the data file processor 7 may be transmitted to the display 6 in accordance with commands entered by use of the input facilities 3, so that a user can, as he desires, read from the display screen 2 just as he would read a conventional book. On the display 2, 50 lines of text each accommodating 30 chanese characters (60 English letters) can be displayed and the text displayed on the screen can be changed easily by operating the input facility 3.

For a modification of the above described embodiment several displays of data stored on the data file are reproduced at one time by operating external input keys and are temporarily stored in the user memory region provided in the main body. An arbitrary display for a user can then be promptly displayed by operating external input keys. By this means a reader user can repeatedly call arbitrarily selected pages of text for display on the screen without delay just as he can during reading of a printed reference.

Furthermore, a matrix array of pressure sensors or photo sensors can be formed on the display so that, by use of touch or of light pen, a user can designate particular portions of the displayed information and store corresponding flags in the user memory in the unit 1, for example, in order to cause important portions of the displayed text to be emphasized, by underlining or inverted letters.

Figure 4:
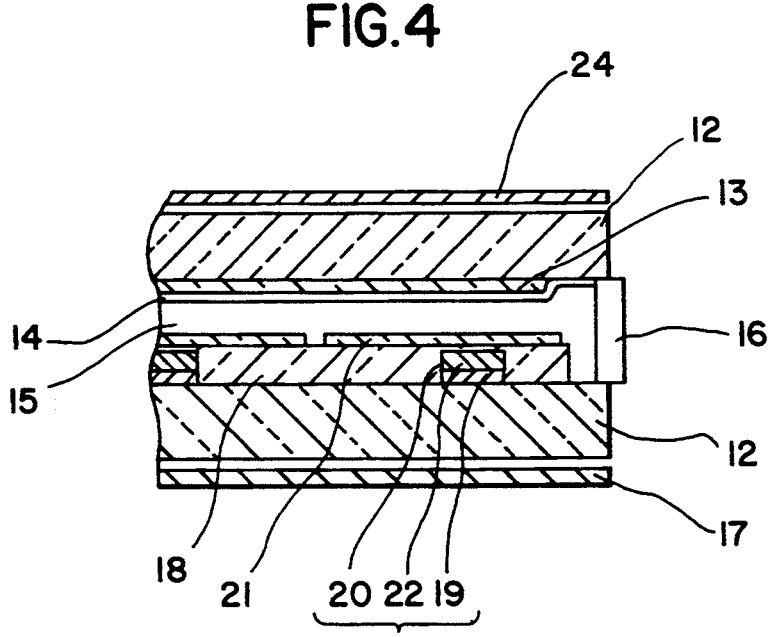
FIG. 4 is a cross sectional view showing a liquid crystal device used in accordance with the invention.

The display which is utilized is of the nonvolatile liquid crystal type as illustrated in a copending application filed Jun. 10, 1988 entitled "Method of Manufacturing Liquid Crystal Device" and assigned to the assignee of the instant application, which is hereby incorporated herein by reference. As shown in FIG. 4, the display includes a 300A thick molibdenum film 19 which is formed as a first electrode for liquid crystal display on a glass substrate 12. Amorphous silicon semiconductor films of the P-type, I-type and N-type are stacked in order to form a pin diode 22 (non-linear element) on the first electrode 19 by a known CVD method. Further, a second electrode 20 is formed from a 2000A thick molibdenum film on the amorphous semiconductor films. An insulating layer 18 is disposed between pin diodes 23 in order to make its upper surface flush with the upper surface of the diodes 23.

An opposite transparent electrode arrangement 13 is formed on a glass substrate and covered by an alignment control film 14. This opposite substrate and the above described substrate carrying the diodes 23 are mated with a sealing adhesive 16 on the peripheral edge as shown in FIG. 4. The electrode arrangement 13 is associated with the pixel electrodes 21 to address particular pixels. A ferroelectric liquid crystal material 15 is disposed between the substrates 12. When an electric field is applied to the liquid crystal by means of the opposing electrodes 13 and 21, the molecules of the liquid crystal are directed along one of the two directions in accordance with the direction of the applied electric field. With this construction, the anisotropicla characteristic of the device can be controlled by switching the direction of the voltage applied to the electrodes 13 and 21. On both sides of the device are polarizing plates 24 and 17. The plate 24 is aligned to have its polarization direction along one of the alignment direction of the liquid crystal and the plate 17 to have its polarization direction perpendicular to the polarization direction of the plate 24. Light passing through the device and the plates is modulated in accordance with the anisotropy of the liquid crystal.

Figure 5:
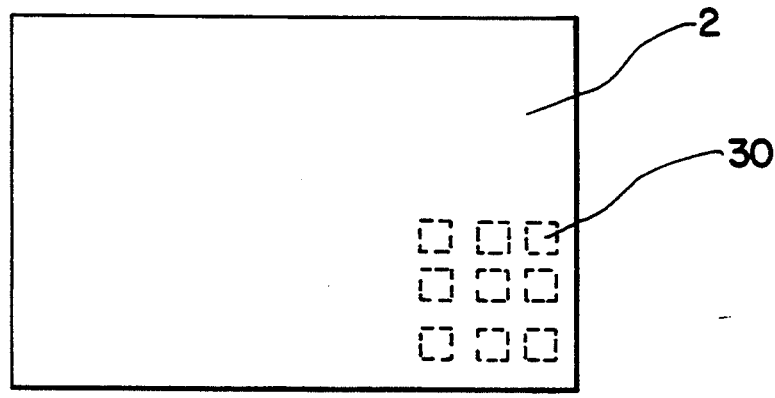
FIG. 5 is a frontal view of the display of FIG. 1.

The liquid crystal display is constructed to provide controls 30 on the display 2, as shown in FIG. 5. When the main switch is turned on, the controls 30 can be operated by a light pen. When a page is displayed, the controls will disappear in order to provide the full area for the display. The book can be driven by the controls except for main skitching.

Figure 6:
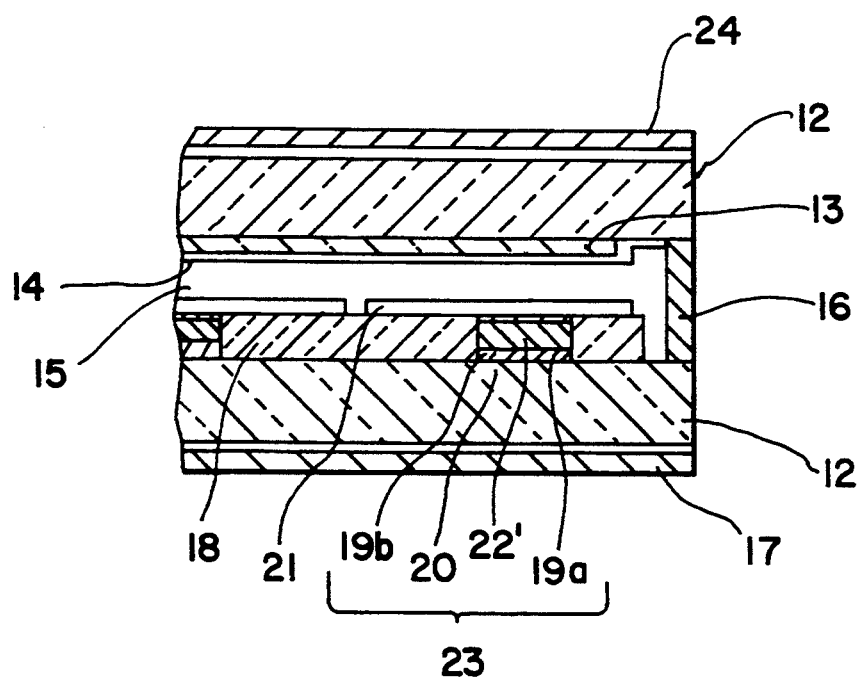
FIG. 6 is a cross sectional view showing a liquid crystal device similar to that of FIG. 4.

FIG. 6 shows a display for utilizing the controls. The structure is the same as that illustrated in FIG. 4 with the exception that the semiconductor layer 22' is formed with a NIN junction and the underlying electrode arrangement includes a pair of electrode strips 19a and 19b for each pixel. The electrode strips extend in the direction perpendicular to the upper electrode arrangement 13 which extends laterally. A photo-sensitive device is formed with the strip 19a and the semiconductor layer 22' and a non-linear device is formed with the other strip 19b and the semiconductor layer 22'.

By virtue of the properties of the ferroelectric liquid crystals, the display can hold any page without energy consumption when the user desires to leave the display showing a particular page. The electricity required to drive the liquid crystal device is such that a solar cell can supply the necessary power for the book.

While the present invention has been described in conjunction with a particular embodiment, it is to be appreciated that the invention is not limited to the described embodiment and that may modifications and variations are possible without departure from the scope of the invention as set forth in the appended claims. For example, the reproducing device of the described paperless book could if desired be provided with a battery for storage of electricity generated by the solar cell. It is further to be appreciated that whilst the paperless book of the invention has been described herein as a replacement for novels and other conventional books having pages of printed text, the book could be adapted to be used as an electronic diary with the facilities 3 enabling the user to make his own entries onto blank "pages" of the book. Yet further, as a memory device, magnetic tapes, EPROMs or any other memory can be employed for this invention.

What is claimed is:

1. A paperless book comprising:
   a first memory for storing information in encoded form;
   a reproducing device for reading information from said memory;
   a display means for visualizing said information;
   a temporary memory for temporarily storing data supplied thereto from said first memory where the amount of data which can be stored in the temporary memory is greater than the amount of data which can be displayed by said display means;
   a matrix array of sensors associated with said display means which can be actuated by a user to designate particular portions of a displayed page;
   emphasizing means connected to said temporary memory and said display means for receiving said user designations, for storing flags identifying the designated portions, and for modifying the appearance of said portions to visually highlight said portions during display on the display means; and
   reference retrieving means connected to the display means for receiving a user instruction to recall a selected page of text containing said designated portion and for causing immediate retrieval and display on the display means of the previously designated information.

2. A paperless book of claim 1 wherein said first memory is an optical disc.

3. A paperless book of claim 1 wherein said first memory is a floppy disc.

4. A paperless book of claim 1 further comprising a solar cell.

5. A paperless book of claim 1 further comprising a lid provided with a solar cell.

6. A paperless book comprising:

an optical disk for storing information in encoded form;

a reproducing device for reading information from said optical disk;

a liquid crystal display means for visualizing said information;

a temporary memory for temporarily storing data supplied thereto from said optical disk where the amount of data which can be stored in the temporary memory is greater tan the amount of data which can be displayed by said display means;

a matrix array of sensors associated with said display means which can be actuated by a user to designate particular portions of a displayed page;

emphasizing means connected to said temporary memory and said display means for receiving said user designations, for storing flags identifying the designated portions, and for modifying the appearance of said portions to visually highlight said portions during display on the display means; and reference retrieving means connected to the display means for receiving a user instruction to recall a selected page of text containing said designated portion and for causing immediate retrieval and display on the display means of the previously designated information.

7. A paperless book of claim 6 further comprising a solar cell.

8. A paperless book of claim 6 further comprising a lid provided with a solar cell.

* * * * *